(No Model.)
J. H. EDDY.
Cutter Head.
No. 239,744. Patented April 5, 1881.
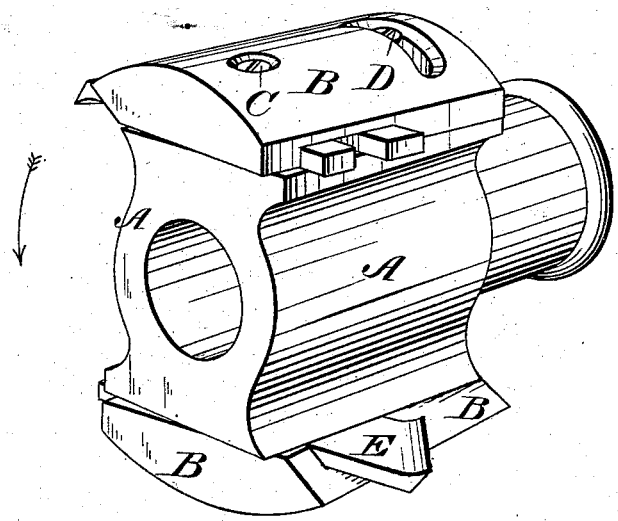
Fig. 1.
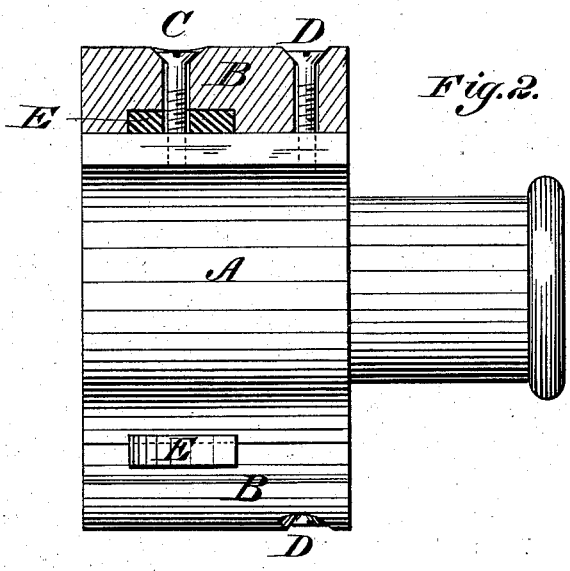
Fig. 2.
Fig. 3.
WITNESSES:
Donn P. Twitchell
J. H. Scarborough
INVENTOR:
John H. Eddy,
BY Munn & Co.
ATTORNEYS.

UNITED STATES PATENT OFFICE.

JOHN H. EDDY, OF SIDNEY, OHIO.

CUTTER-HEAD.

SPECIFICATION forming part of Letters Patent No. 239,744, dated April 5, 1881.

Application filed August 9, 1880. (No model.)

*To all whom it may concern:*

Be it known that I, JOHN HENRY EDDY, of Sidney, in the county of Shelby and State of Ohio, have invented a new and useful Improvement in Cutter-Heads for Molding and Matching Machines, of which the following is a specification.

Figure 1 is a perspective view of the improvement. Fig. 2 is a side elevation, partly in section. Fig. 3 is a plan view of one of the knives.

The object of this invention is to furnish molding and matching cutter-heads so constructed that the knives can be adjusted to cut any desired bevel without pitching or tilting the spindle, and that they will cut the lumber against the grain without scraping.

The invention consists in constructing a cutter-head of a stationary part and two or more movable parts having grooves upon their inner sides to receive the knives, a hole passing through the knife-groove to receive the pivoting-bolt, and a curved slot to receive the fastening-bolt, and also in constructing the knives with their cutting-edges concaved upon the forward side and rounded upon the rear side, as will be hereinafter fully described.

Similar letters of reference indicate corresponding parts.

A represents the body or stationary part of a cutter-head, which is secured to the spindle in the ordinary manner.

B are the movable parts of the cutter-head, which rest upon flattened surfaces of the part A, and are secured in place by screw-bolts C D. The inner side of each part B is grooved or notched to receive the knife or cutter E, which is slotted longitudinally from its rear end to receive the bolt C, so that it can be set forward as it wears. The bolt C passes through the part B, through the slot in the knife E, and into the stationary part A, so as to clamp the knife E firmly in place. The bolt D passes through a slot in the part B and into the part A. The slots in the movable parts B are curved upon the arcs of circles having the axes of the bolts C for their centers, so that by loosening the bolts C D the parts B, and with them the knives E, can be turned upon the bolts C to adjust the said knives E to cut any desired bevel, and when adjusted can be secured firmly in place by again tightening the said bolts C D. The cutting-edges of the knives E are curved slightly forward, or the forward sides of the said edges are slightly concaved, as shown in Fig. 1. This construction brings the cutting-edges of the knives into such a position that they will cut against the grain of the wood, coming in direct contact with the wood instead of scraping, and will thus cut easier and with less wear of the knives, and will require less power to drive them.

Having thus fully described my invention, I claim as new and desire to secure by Letters Patent—

1. A cutter-head constructed substantially as herein shown and described, consisting of the stationary part A and the movable parts B, having grooves upon their inner sides to receive the knives E, a hole passing through the knife-groove to receive the bolt C, and a curved slot to receive the bolt D, as set forth.

2. In a cutter-head, the combination, with the stationary part A, having flat surfaces, of the movable parts B, having grooves in their inner sides to receive the knives E, having holes through them, passing through their grooves, to receive the pivoting-bolts C, and curved slots to receive the fastening-bolts D, substantially as herein shown and described, whereby the movable parts can be adjusted to adjust the knives to cut at any desired bevel, as set forth.

JOHN H. EDDY.

Witnesses:
H. WILSON,
JAMES L. AYRES.